United States Patent [19] [11] 4,294,432
Blair et al. [45] Oct. 13, 1981

[54] METHOD AND APPARATUS FOR COOLING BOF HOOD PANELING

[75] Inventors: Matthew J. Blair, Niles; Thomas A. Wiktorowski, Parma Heights, both of Ohio

[73] Assignee: Republic Steel Corporation, Cleveland, Ohio

[21] Appl. No.: 155,311

[22] Filed: Jun. 2, 1980

[51] Int. Cl.³ ............................................. C21B 7/10
[52] U.S. Cl. .................................... 266/46; 75/60; 266/158; 266/243
[58] Field of Search ..................... 266/46, 158, 243; 75/60

[56] References Cited

U.S. PATENT DOCUMENTS

| | | | |
|---|---|---|---|
| 1,662,811 | 3/1928 | Bowers | 266/147 |
| 2,333,439 | 11/1943 | Peters | 266/46 |
| 3,026,102 | 3/1962 | McFeaters | 266/142 |
| 3,588,070 | 6/1971 | Richardson | 455/46 |
| 3,599,949 | 8/1971 | Grenfell | 75/60 |
| 3,603,572 | 9/1971 | Rosentern | 75/60 |
| 3,626,672 | 12/1971 | Burbidge | 422/102 |
| 3,655,361 | 4/1972 | Brown | 75/60 |
| 3,988,421 | 10/1976 | Rinaldi | 75/60 |
| 4,040,819 | 8/1977 | Rounds | 75/60 |
| 4,057,421 | 11/1977 | Fukui | 75/60 |

Primary Examiner—P. D. Rosenberg
Attorney, Agent, or Firm—Watts, Hoffmann, Fisher & Heinke Co.

[57] ABSTRACT

A method and apparatus for making steel in a basic oxygen furnace installation, in which water is sprayed from a central location within and at the open end of an exhaust hood 12 outwardly toward the inside hood surface to cool the hood and wet the off-gases during a blow. A ring-like spray manifold 22 is supported on an oxygen lance 14 for automatic insertion to the proper location in the hood, for removal with the lance, and for automatic operation concurrently with the supplying of oxygen.

11 Claims, 7 Drawing Figures

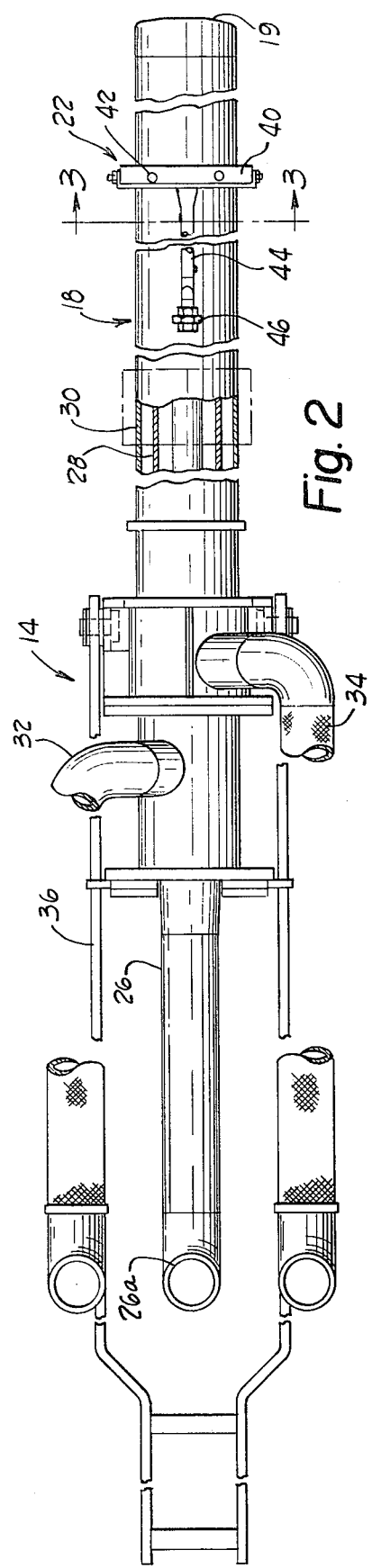
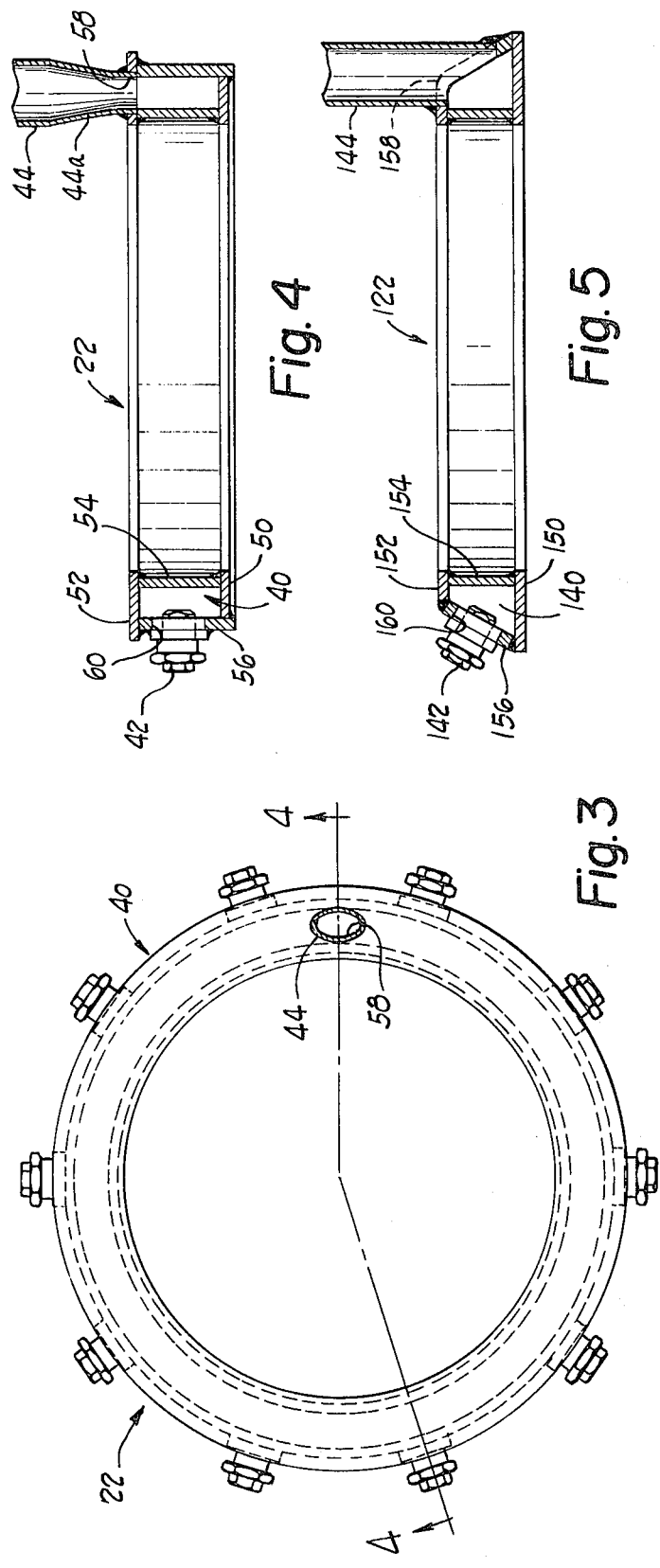

METHOD AND APPARATUS FOR COOLING BOF HOOD PANELING

DESCRIPTION

1. Technical Field

This invention relates to steel making, and particularly to a water spray associated with an oxygen lance for cooling an exhaust hood for a basic oxygen furnace.

2. Background Art

An exhaust hood over a basic oxygen furnace is used for collecting and controlling off-flow gas created by the production of steel. The collected gases are treated prior to discharge into the atmosphere. The excessive heat generated by the process requires that the hood be cooled. Typically, such cooling is accomplished by water circulated internally within the hood panels and by water sprays carried by the hood. It is usual to locate the sprays adjacent the bottom or lower end of the hood, at the hood periphery, and also higher in the hood. Water discharged by the sprays is also used to reduce pollution by wetting dust particles in the off-flow.

The spray structure around the bottom or lower end of the exhaust hood has a relatively short useful life. One reason is that when introduction of oxygen into the furnace is stopped, the sprays are turned off. Thereafter, because of the location, the spray structure becomes covered with slag. In addition, the spraying of water from the periphery of the hood toward the center of the exhaust passage has not been entirely effective in providing the desired hood cooling.

From the standpoint of pollution control, many sprays associated with exhaust hoods have not been entirely satisfactory. The lower sprays soon become inoperative. Sprays located above the lower end of the hood are often not turned on until late in a blow, because they are temperature actuated (typically being turned on at 550° F. to 700° F.) and therefore do not aid in pollution control in the initial stage of the blow, but only after there has been a substantial rise in temperature. The sprays high in the hood also tend to put water droplets into the electrostatic precipitator at the exhaust end of the hood, which have an adverse affect upon the operation of the precipitator. Water sprays high in the hood, used in conjunction with steam and oxygen lances in a basic oxygen steel process, are shown in U.S. Pat. No. 4,040,819.

DISCLOSURE OF THE INVENTION

The present invention provides a method and apparatus for cooling the exhaust hood of a basic oxygen furnace and for improving pollution control by spraying water into the furnace off-flow at the bottom of the exhaust hood, from a location at the center of the hood and in a direction toward the inside peripheral hood surface. Spraying apparatus is located centrally of the hood, adjacent the open end. Advantageously, it is carried by the oxygen lance for proper positioning when the lance is operative and for automatic removal when the lance is withdrawn from the exhaust hood. As a result, the spraying apparatus is protected against heat and slag buildup during times of non-operation, to which existing lower hood sprays are subjected. The water spray is controlled automatically with the supply of oxygen through the lance, so whenever the oxygen injection functions and emissions are created, the water spray is operated. This results in substantial benefit in reducing pollution from the initial fume surge at the start of a blow.

In the preferred embodiment of the invention, the spray is achieved with a manifold ring that closely encircles the oxygen lance, being secured to the lance at a location where in use it will be at or slightly above the bottom opening of the hood. A plurality of spray nozzles are provided about the manifold ring, pointing in an outward direction toward the surrounding exhaust hood. The individual nozzles each provide a flat or conical spray pattern, with the patterns of adjacent nozzles intersecting, to form a transverse curtain of water and water vapor or steam from the central position of the lance toward the hood. The nozzles direct the spray horizontally or slightly upward. A control valve for the water supply to the manifold is actuated automatically with the oxygen supply control. Insertion and removal of the lance for operation of the furnace positions the manifold and spray nozzles in proper position, removes them when the use of oxygen has ended, and conveniently assures both cooling and pollution control during the entire period that the oxygen is supplied.

The above and other features and advantages of the invention will become more apparent from the detailed description that follows, when considered in connection with the accompanying drawings.

BRIEF DESCRIPTION OF DRAWINGS

FIG. 2 is a side elevational view of an oxygen lance incorporating the present invention;

FIG. 3 is a top plan view of a manifold and nozzle assembly embodying the present invention, as viewed from the plane of line 3—3 of FIG. 2, with the lance removed;

FIG. 4 is a sectional view taken along the line 4—4 of FIG. 3;

FIG. 7 is a sectional view taken along the line 7—7 of FIG. 6.

BEST MODE FOR CARRYING OUT THE INVENTION

Figure 1:
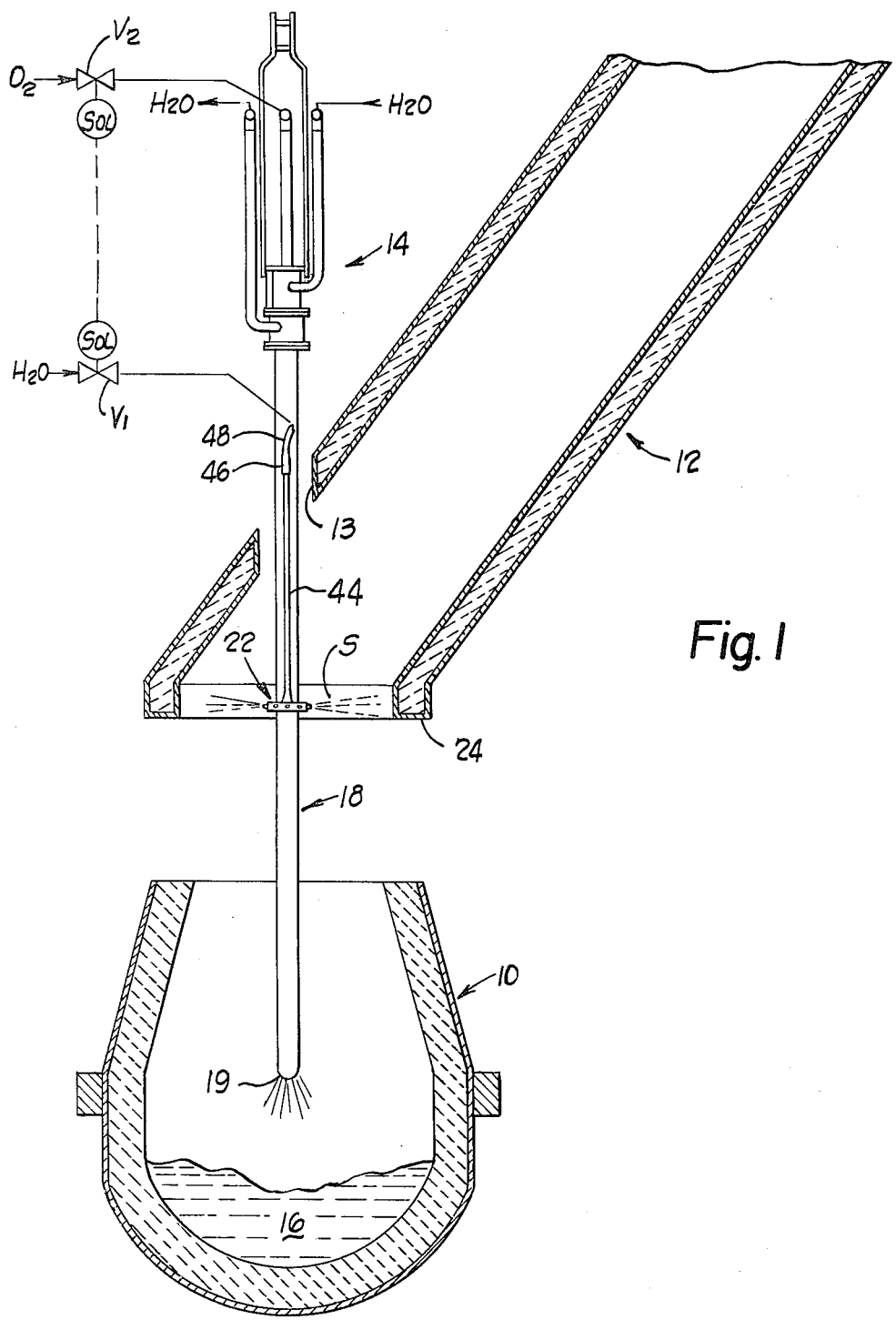
FIG. 1 is a diagrammatic view partly in elevation and partly in section illustrating the general arrangement of a basic oxygen furnace, exhaust hood, and oxygen lance embodying the present invention.

With reference to the drawings, a basic oxygen furnace vessel 10 and exhaust hood 12 of conventional design are shown in FIG. 1. An oxygen lance 14 has a barrel 18 that extends through an opening 13 in the hood 12 and into the furnace vessel 10. The lance is suspended above the hood by conventional supports (not shown) and is illustrated in a position for introducing oxygen above a charge 16 in the vessel. In this position a discharge end 19 of the barrel is located at a predetermined position above the surface of the charge 16. Upon completion of a "blow" during which oxygen is introduced, the lance is removed from the furnace and hood through the opening 13.

In accordance with this invention, a manifold and nozzle spray assembly 22 is carried by and encircles the lance barrel 18 at a fixed location, as illustrated in FIG. 1. With the barrel 18 oriented in a vertical working position, the manifold is in a horizontal plane, even with or slightly above the bottom edge 24 of the hood 12. In this position and orientation, the spray assembly 22 directs a water spray S outward from the lance 14 in a generally horizontal plane, or alternatively, slightly upward, toward the surrounding hood 12, to cool the hood and to form a water curtain that wets particles of the off-flow gases created during the blow. By way of example, in a particular embodiment, the spray ring is located 23 and ½ feet from the lance tip 19 and the lance tip is six feet above the charge 16.

The lance 14 is shown in more detail in FIG. 2 of the drawings. A central oxygen-carrying pipe 26 has a supply end 26a at the top of the lance in the orientation of FIG. 1, and an open end 26b at the discharge end 19 of the barrel 18 and forms a central conduit of the barrel. A double water jacket surrounds the oxygen-carrying pipe and is formed by two concentric jackets 28, 30, the outer jacket 30 forming a supply conduit and the inner jacket 28 a return conduit, each communicating respectively with a supply pipe 32 and a return pipe 34 at the upper end of the barrel 18, which is located outside of the hood 12. A bale bar 36 is pivotally secured to the oxygen lance adjacent the pipes 32, 34, for transporting the lance.

The manifold and nozzle spray assembly 22 closely encircles the barrel 18 in a plane perpendicular to the longitudinal axis of the barrel. The assembly 22 is comprised of an annular manifold 40, circumferentially spaced nozzles 42 extending from the manifold, and a rigid supply pipe 44 perpendicular to the manifold and parallel to the barrel 18. The manifold 40 and pipe 44 are tack welded to the barrel to be rigidly secured in place and carried by the lance. A coupling 46 on the pipe 44 serves to couple the manifold to a flexible water supply conduit 48. The flexible water supply conduit is connected with a control valve V1 that is operated automatically with an oxygen supply. valve V2 to the lance. In operation, both the oxygen and the water supply to the spray assembly 22 are turned on and off concurrently by solenoid actuation. Thus, once the manifold assembly 22 is coupled to the water supply for operation, no separate control of the water spray is required.

A preferred manifold and nozzle assembly construction is shown in FIGS. 3 and 4 of the drawings. The assembly 22 is comprised of two spaced axially aligned rings 50, 52, the ring 52 being the upper ring in the orientation of FIG. 1, and inner and outer cylindrical walls 54, 56, respectively. The inside diameters of the rings 50, 52 closely surround the barrel 18, with a slight clearance. The outside diameter of the rings is kept relatively small to facilitate insertion and removal of the lance and assembly 22 through the opening 13 of the exhaust hood. The small outside diameter of the assembly has required an oval opening 68 in the ring 52 at which the pipe 44 is welded. As shown in FIGS. 3 and 4, the pipe has a transition portion 44a that changes from circular cross-section to an oval cross-section where it joins the opening 68. The junctures of the cylindrical walls 54, 56 with the rings 50, 52 are welded to provide a sealed annular manifold. The nozzles 42 are equally spaced about the periphery of the manifold. Ten nozzles are shown in the preferred embodiment. The nozzles communicate with the manifold through openings 60 in the wall 56 so that water supplied through the pipe 44 and manifold 40 can be discharged as a spray through the nozzles 42. In the preferred embodiment of FIGS. 3 and 4, the nozzles are oriented to direct a spray in the plane of the manifold, i.e., horizontally when the lance is vertical.

Figure 5:
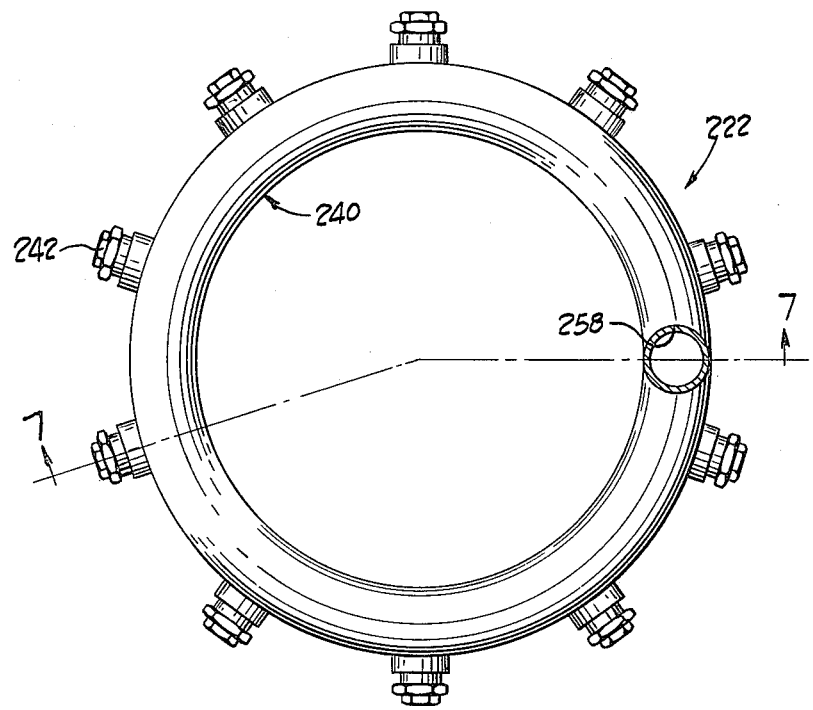
FIG. 5 is a sectional view similar to that of FIG. 4, but illustrating a modified embodiment in which nozzles are directed slightly upward from the plane of the manifold.

A manifold assembly 122 of modified construction is shown in FIG. 5. This assembly has an annular manifold 140 formed by a lower ring 150, an upper ring 152 having a substantially smaller outside diameter than the lower ring, an inner cylindrical wall 154 and an outer wall 156 inclined at a 60° angle to the plane of the lower ring 150, the outer wall being frusto-conical in shape. An opening 158 is in the wall 156 and partially in the ring 152 to which a supply pipe 144 communicates. The juncture of the pipe and manifold is sealed about the opening with an appropriate weld. To accommodate the frusto-conical shape of the wall 156, the lower ring 150 is of somewhat larger diameter than the corresponding ring 50 of the embodiment shown in FIGS. 3 and 4. As a result, it is not necessary that the supply pipe 144 have an oval transition portion, but rather the opening 158 can accommodate the full diameter of the pipe 144. Nozzles 142 are of the same construction as the nozzles 42 and are secured in openings 160 equally spaced about the wall 156. The central axis of each nozzle 142 is perpendicular to the wall 156 and therefore extends at an angle of 30° from the plane of the annular manifold 140. When the manifold assembly 122 is secured about the barrel of an oxygen lance, the nozzles direct their spray at angle 30° upward from the plane of the manifold.

Figure 6:
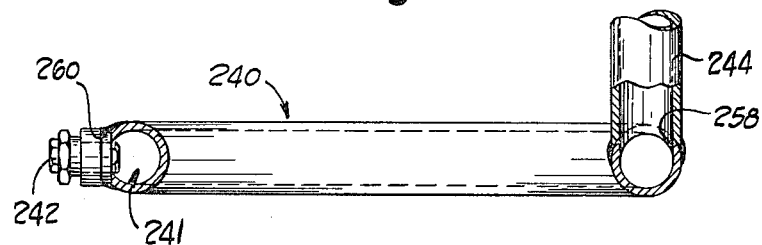
FIG. 6 is a top plan view of another embodiment of a manifold and nozzles of the present invention.

A third embodiment of a manifold assembly 222 is shown in FIGS. 6 and 7 of the drawings. A ring-like or annular manifold 240 is formed of a pipe with a circular cross-section. A circular opening 258 in an upper surface of the pipe accommodates a supply pipe 244 of circular cross-section, the pipe and manifold being welded about the opening. Equally spaced openings 260 about the outer perimeter of the manifold 240 receive nozzles 242 of the same construction as the nozzles 42 and 142. As shown, the nozzles are oriented along a mid-plane of the manifold, with the central axis of the spray produced by each nozzle directed in the plane of the manifold, i.e., horizontally in use.

The nozzles 42, 142 and 242 shown produce a substantially flat, fan-like spray; i.e., a pattern that fans out in a plane. In the case of the embodiment of FIGS. 3, 4, 6 and 7, the fan spreads in the plane of the manifold. In the case of the embodiment of FIG. 5, the spray fans in a frusto-conical pattern that extends from the manifold outward and upward at 30° from the plane of the manifold. The spray pattern from each nozzle intersects that of the next to provide a curtain of water and vapor between the lance and the surrounding exhaust hood. Water is supplied through the supply pipes 44, 144 and 244 to the manifolds 40, 140 and 240 with sufficient pressure and volume to produce a spray of sufficient force to reach the exhaust hood even in the presence of a strong upflow of the off-gas from the furnace, which passes through the spray curtain. Typically, factory water is supplied at a rate of between 50 to 100 gallons per minute. Suitable nozzles are Unijet Nozzle Flat Spray Tip No. 6540, which produce a flat spray. Preferably 10 such nozzles are utilized about the manifold. Alternatively, Whirl Jet Nozzles, designation ¾ BD 20, of Spraying Systems Co., can be used which produce a hollow cone spray pattern with a spread of about 70°, rather than a flat spray. The nozzles, in connection with the available water pressure, must be capable of producing a fine spray capable of penetrating the gas stream from the furnace, and must provide good gas/water contact.

While the preferred embodiments described utilize a single manifold ring, one or more additional rings can be provided in a similar manner, but at different heights along the lance to provide additional sprays for increased cooling and pollution control.

In operation, when the oxygen is supplied through the lance 14, the water spray from the manifold assembly 22 (alternatively from manifold assemblies 122 or 222) is automatically started through the control valve VI responsive to the operation of the oxygen control valve. The water, being directed outward, preferably impinges upon the surface of the lower hood panels and effectively cools them. Even where direct impingement is not achieved due to lack of sufficient water pressure relative to the velocity of the off-gas, as when the velocity is especially high, the spray will still effectively cool the gases that heat the hood and will thereby indirectly cool the hood.

By virtue of the concurrent spray of water with the initiation of the oxygen, the initial fume emission normally seen at the start of blowing, and objectionable from an environmental standpoint, is essentially eliminated. This primarily results from steam formed from the spray adhering to dust particles. The wetted dust is more readily precipitated by the electrostatic precipitator than is non-wetted dust. Upon completion of the blow and cessation of oxygen supply, the lance and manifold assembly are removed from the furnace environment. As a result, skulling of the manifold assembly and particularly the spray nozzles from slag is minimized and the spray assembly remains operational for a relatively long time as compared with conventional hood-supported sprays at the open end of an exhaust hood. The use of this manifold assembly permits removal of the conventional bottom row of sprays used with exhaust hoods, which suffer from slag accumulation after the spraying is stopped and which at best did not cool as effectively because of the direction of spraying from the hood panels inward. Removal of some conventionally used upper bank spray rings has also been possible, because the present efficient spray at the source of the fumes assures good water-dust contact from the beginning. Also it does this earlier in the cycle, before the higher sprays would normally be operated, i.e, at the outset of a blow, when the temperature of the off-gas is too low to trigger the upper sprays. The operational life of the internally water cooled panels that form the exhaust hood has been improved significantly with the use of the manifold assembly 22, lasting through many more heats and requiring fewer repairs, due to the more efficient cooling.

While preferred embodiments of the invention have been described in detail, various modifications and alterations may be made therein without departing from the spirit and scope of the invention set forth in the appended claims.

I claim:

1. In a method of making steel in a basic oxygen furnace having an oxygen lance and an exhaust hood over the furnace, the steps comprising: providing a plurality of fluid outlet spray nozzles about the oxygen lance at a location adjacent the bottom edge of the exhaust hood when the lance is in an operative position in the furnace, supplying water under pressure to the nozzles, and directing the water outwardly from the lance toward the hood, with spray streams from adjacent nozzles intersecting between the lance and the hood.

2. A method as set forth in claim 1 including the step of starting and stopping the flow of oxygen from the lance and automatically starting and stopping the water spray concurrently with and in response to the oxygen flow.

3. A method as set forth in claim 1 including the step of starting the water spray in response to moving the lance to an operative position in the furnace.

4. A method of externally cooling an exhaust hood over a steel making vessel, comprising the step of spraying water in a plurality of expanding patterns toward the exhaust hood from a location that is centrally within a bottom opening of the hood.

5. In a method of making steel in a basic oxygen furnace having an oxygen lance and an exhaust hood over the furnace, the steps comprising: introducing and removing a ring of spray nozzles to and from a central location within the exhaust hood concurrently with the introduction and removal of the oxygen lance, locating the ring at a location substantially even with or slightly above the bottom of the hood prior to the introduction of oxygen to the furnace through the lance, and spraying water from the spray nozzles of the ring concurrently with the supplying of oxygen through the lance.

6. A method as set forth in claim 5 wherein the spray nozzles direct the water in a generally horizontal or upward direction.

7. A lance for introducing oxygen to a basic oxygen furnace having a water cooled tubular portion with a discharge end, said portion adapted to extend downwardly through an exhaust hood and into the furnace, the improvement comprising a ring-like manifold encircling said lance portion oriented to be essentially horizontal in use and at a location from the discharge end to locate it within the exhaust hood during use, means securing the manifold to said lance portion, a conduit for feeding water to the manifold, and a plurality of circumferentially spaced spray nozzles about the manifold directed outwardly from the lance and with the central axis of the spray pattern of each nozzle directed either in the plane of the manifold or above the plane when the manifold is positioned for use within a hood.

8. A lance as set forth in claim 7 in which the improvement further comprises nozzles each having a spray pattern that intersects that of the adjacent nozzle.

9. A lance as set forth in claim 8 wherein each nozzle is constructed to produce a spray pattern that is substantially flat in the plane of the manifold and fans out within the plane.

10. In a basic oxygen furnace installation including a furnace vessel open at the top, an exhaust hood with an open lower end over the top of the vessel, an oxygen lance extending downward through the hood and into the vessel, and means to control the flow of oxygen through the lance, the improvement comprising a ring-like manifold encircling the lance at a location adjacent the lower open end of the exhaust hood, means securing the manifold to the lance, a conduit for feeding water to the manifold, a plurality of circumferentially spaced spray nozzles about the manifold directed outwardly from the lance toward the hood, and means to control the feeding of water to the manifold to produce a water spray from the nozzles concurrently with the flow of oxygen through the lance.

11. Steel making apparatus comprising an open-topped vessel for holding a charge of metal to be treated, an exhaust hood with an open lower end over the top of the vessel, spray means centrally of the lower open end of the exhaust hood and above the vessel for spraying water toward the hood inside surface, means supporting the spray means for movement to and from said central location, means to introduce gas into the vessel for treatment of the charge, and means to control a supply of water to the spray means in coordination with the introduction of the gas into the vessel.

* * * * *